United States Patent Office 2,783,513
Patented Mar. 5, 1957

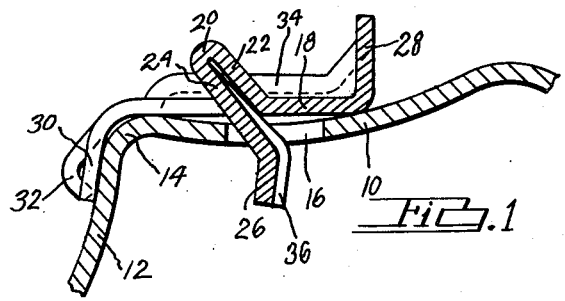
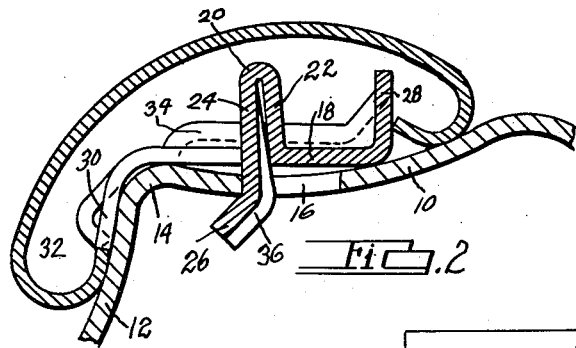
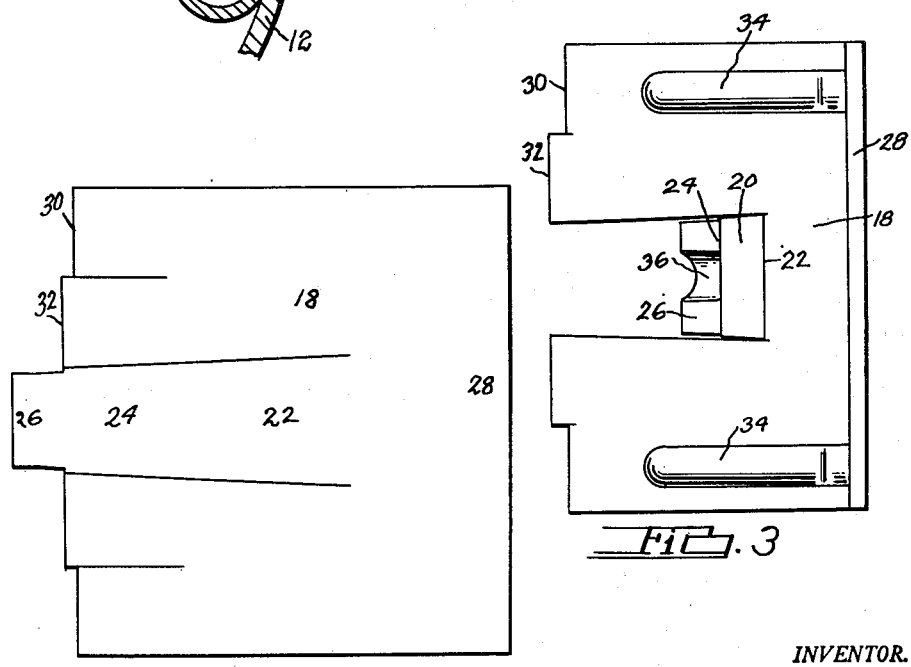
INVENTOR.
EDWIN F. ELMS
BY
HIS ATTORNEY

2,783,513
FASTENER FOR CORNER MOLDINGS
Edwin F. Elms, Roseville, Mich., assignor to Robert L. Brown, Ferndale, Mich.

Application January 4, 1955, Serial No. 479,774

1 Claim. (Cl. 24—73)

This invention relates to a fastener and more particularly to a fastener to be secured to an outside corner panel member to which is attached a flanged molding.

In the manufacture of body panels, for example, where the body panel is formed having an outside corner and a molding is secured to the corner, variations exist in the distance between the edge of an aperture in the panel for receiving the fastener, and the flanged edge of the panel, making it difficult to hold the edge of the fastener, which holds the flanged edge of the molding, flush with the panel. This results in the molding being improperly positioned on the outside corner of a panel.

It is therefore an object of the present invention to provide a fastener having an edge flange, projecting from one side of the body portion, for engagement with the panel flange and to provide a bendable part on the fastener, which serves as a pry and locking member in an aperture in the body of the panel, for drawing the fastener tightly over an outside corner and locking the fastener to the panel. After the fastener has been applied to the panel, the molding is snapped over the opposite edges of the fastener and held flush with the body panel.

Another object of the invention is to provide a reinforced bendable member which may be operated from one side of the fastener and panel, to draw an extension thereof, on the opposite side of the fastener and panel into tight engagement with the panel.

Other objects and advantages of the invention will more fully appear from the following description taken in connection with the accompanying drawings, in which:

Fig. 1 is a cross sectional view through the improved fastener and apertured panel, showing the fastener before it is locked to the panel;

Fig. 2 is a view corresponding to Fig. 1, but showing the fastener in its applied position, locked to the panel and showing the molding applied to the fastener;

Fig. 3 is a top plan view of the fastener as shown in Fig. 2; and

Fig. 4 is a top plan view of the blank from which the fastener is formed.

Referring to the drawings, a body panel 10 is shown having a downwardly extending flange 12 forming an outside corner 14. The body panel 10 is provided with an aperture 16 extending therethrough.

The fastener is formed from a flat sheet of metal stock which is blanked and pressed to shape. It comprises a body portion 18 from which a tab 20 is struck out of one edge, integrally united to the body portion 18 at its inner end. This tab is bent upwardly, as at 22, above the plane of the body 18 and then reversely bent back, as at 24, along the plane of the upwardly extending portion 22 to a point extending below the plane of the body. Normally the double thickness, 22 and 24, extend outwardly and upwardly at approximately an angle of forty-five degrees to the plane of the body, as shown in Fig. 1. The lower free end of the portion 24 is bent outwardly at an angle to the plane of the portion 24 to provide a hook-like portion 26. This hook-like portion extends substantially perpendicular to the plane of the body when the tab 20 is in its normal position, shown in Fig. 1, to freely enter the aperture 16 in the body panel.

The fastener is also provided with a flange 28 extending upwardly from the plane of the body portion 18 at an outer edge of the fastener. Another flange 30 is extended downwardly at the opposite edge of the fastener which is the edge of the fastener from which the tab 20 is formed. This flange 30 has an outwardly pressed portion 32 extending beyond the plane of the flange 30.

As a means for stiffening the body portion 18 there are provided stamped out upwardly extending ribs 34 which are carried into the body of the upwardly extending flange 28, thereby stiffening the flange 28 with the body portion 18. The portion 24 of the tab 20 is provided with a longitudinally extending rib 36, facing the portion 22, to add stiffness to the portion 24 and hook-like portion 26, so that there is no bending between the portion 24 and hook-like portion 26.

When the fastener is assembled to the body panel 10 the flange 30 of the fastener is placed in contact with the flange 12 of the body panel and the body portion 18 of the fastener lies on the panel 10 with the downwardly extending free end portion 26 of the tab 20 freely entering the opening 16 in the body panel. The operator then bends the tab 20, by a pair of pliers or the like, to a vertical position, forcing the hook-like end 26 into pressure engagement with the lower edge of the aperture 16, drawing the flange 30 of the fastener tightly against the flange 12 of the body panel. At the same time the fastener is drawn down into tight engagement with the upper surface of the body panel 10. Thus the fastener is held in tight engagement with the outside corner and any variations in the distance from the outside edge to the edge of the aperture is compensated for by the bending of the tab 20 and its hook-like end 26.

The invention has been illustrated in its preferred form but it will be understood that various changes, including the size, shape and arrangement of parts, may be made without departing from the spirit thereof, and it is intended to cover such changes as may be reasonably included within the terms of the appended claim.

I claim:

A fastener for the outside corner of a body panel having an aperture through the body of the panel comprising, a body portion having a tab projecting upwardly above the plane of the body portion, the tab being formed by stamping the metal of the fastener into a reversely bent portion above the plane of said body and initially extending at an obtuse angle to said body portion with the free end thereof extending downwardly below the plane of the body portion for entering the aperture in the body panel, a downwardly extending flange at one edge of said body portion embracing the outside corner of the body panel, and a rigidly upwardly extending flange at an opposite edge of said body portion, the free end of said tab below the plane of said body portion being bent toward said downwardly extending flange forming a hook-like portion, whereby when the upper portion of said tab is bent toward said upwardly extending flange substantially perpendicular to said body portion the hook-like portion of said tab pressing against a lower edge of the aperture drawing the downwardly extending flange of said body portion into tight engagement with the outside corner of the body panel.

References Cited in the file of this patent

UNITED STATES PATENTS

| | | |
|---|---|---|
| 2,128,004 | Lombard | Aug. 23, 1938 |
| 2,282,996 | Dyresen | May 12, 1942 |
| 2,428,338 | Poupitch | Sept. 30, 1947 |
| 2,471,247 | Stadler | May 24, 1949 |
| 2,476,207 | Brown | July 12, 1949 |
| 2,670,512 | Flora | Mar. 2, 1954 |
| 2,671,254 | Meyer | Mar. 9, 1954 |